(12) United States Patent
Hamied et al.

(10) Patent No.: US 7,154,939 B2
(45) Date of Patent: Dec. 26, 2006

(54) ADAPTIVE VECTOR MODULATION METHOD AND SYSTEM

(75) Inventors: Khalid Abdul-Aziz Hamied, Naperville, IL (US); Kenneth Anderson Stewart, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 833 days.

(21) Appl. No.: 10/068,643

(22) Filed: Feb. 5, 2002

(65) Prior Publication Data

US 2003/0147458 A1 Aug. 7, 2003

(51) Int. Cl.
*H04B 1/38* (2006.01)

(52) U.S. Cl. ...................................... 375/219

(58) Field of Classification Search ............... 375/219, 375/295, 316; 455/73, 91, 130
See application file for complete search history.

(56) References Cited

U.S. PATENT DOCUMENTS

| | | | | |
|---|---|---|---|---|
| 5,226,057 A | * | 7/1993 | Boren | 375/350 |
| 6,032,033 A | * | 2/2000 | Morris et al. | 455/277.2 |
| 6,600,933 B1 | * | 7/2003 | Hiramatsu et al. | 455/561 |
| 6,782,043 B1 | * | 8/2004 | Dehghan et al. | 375/224 |
| 6,873,835 B1 | * | 3/2005 | Kawaguchi | 455/277.1 |
| 6,975,666 B1 | * | 12/2005 | Affes et al. | 1/1 |

OTHER PUBLICATIONS

Siavash M. Alamouti, "*A Simple Transmit Diversity Technique for Wireless Communications,*" IEEE Journal on Select Areas in Communciations, vol. 16, No. 8, Oct. 1998, pp. 1451-1458.

Gregory G. Raleigh and John M. Cioffi, "*Spatio-Temporal Coding for Wireless Communciation,*" IEEE Transactions on Communciations, vol. 46, No. 3, Mar. 1998, pp. 357-366.

Kamyar Rohani, Mark Harrison and Kiran Kuchi, "*A Comparison of Base Station Transmit Diversity Methods for Third Generation Cellular Standards,*" Motorola Labs, Access Technologies Research—Fort Worth, © 1999 IEEE, pp. 351-355.

Vahid Tarokh, Hamid Jafarkhani, and A. Robert Calderbank, "*Space-Time Block Coding for Wireless Communciations: Performance Results,*" IEEE Journal on selected Areas in Communciations, vol. 1, No. 3, Mar. 1999, pp. 451-460.

V. W. Wolniansky, G. J. Foschini, G. D. Golden and R. A. Valenzuela, "*V-Blast: An Architecture for Realizing Very High Data Rates Over the Rich-Scattering Wireless Channel,*" © 1998 IEEE, pp. 295-300.

* cited by examiner

*Primary Examiner*—Pankaj Kumar

(57) ABSTRACT

A transceiver for implementing an adaptive vector modulation method is disclosed. In response to a binary stream assembled into groups of bits forming symbol indices, a transmitter of the transceiver generates one or more complex values symbols that are normalized over channel coefficients associated with one or more propagation channels between one or more transmitter antennas and one or more receiver antennas. The transmitter controls a transmission of the complex values symbol(s) from the transmitter antenna(s) to a selected receiver antenna. The selection of the receiver antenna is based upon a metric proportional to the average injection power or a vector norm corresponding to each receiver antenna of the receiver antenna(s).

24 Claims, 4 Drawing Sheets

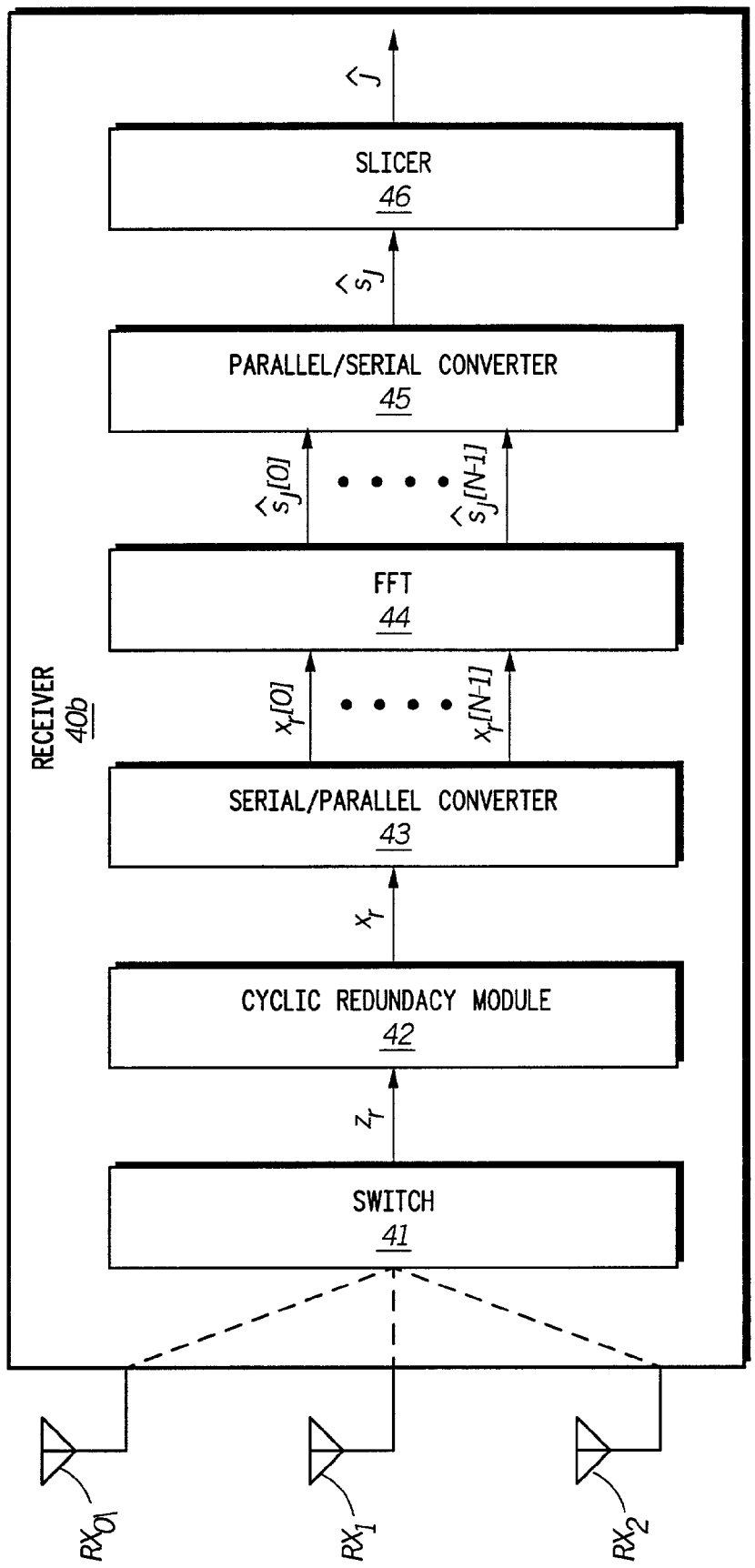

ADAPTIVE VECTOR MODULATION METHOD AND SYSTEM

FIELD OF THE INVENTION

In general, the present invention relates to the field of communication systems. More specifically, the present invention relates to multi-antenna transceivers and links within wireless systems.

BACKGROUND OF THE INVENTION

Prior art wireless communication systems such as $2^{nd}$ and $3^{rd}$ generation cellular systems (e.g., ETSI GSM, TIA IS-95, 3GPP UMTS, etc.) and wireless local area network systems (e.g., IEEE 802.11b) are generally capable of sustaining maximum information bit rates of approximately 20 Mbps or less. Future applications for extremely high speed personal wireless communication links anticipate information bit rates well above 100 Mbps. Further, the personal (and possibly wearable) nature of the services anticipated to be supported by such links require extremely low-power operation, and therefore minimal complexity in baseband signal processing (including demodulation and error correction stages).

The present invention offers an improved capacity for communication systems employing a high speed link capacity with low associated signal processing complexity.

SUMMARY OF THE INVENTION

One form of the present invention is a method of operating a transceiver including one or more transmitter antennas, at least one receiver antenna, and one or more propagation channels between the one or more transmitter antennas and the one or more receiver antennas. First, a binary stream assembled into groups of bits forming symbol indices is received by the transceiver. Second, the transceiver generates at least one complex symbol value in response to a reception of the binary stream with each one complex symbol value being normalized over one or more channel coefficients associated with the propagation channel(s). Thereafter, one of the receiver antennas is selected to receiver the at least one complex symbol value from the transmitter antenna(s). In one aspect, the selection of the receiver antenna is a function of a metric proportional to an average injection power corresponding to the selected receiver antenna. In another aspect, the selection of the receiver antenna is a function of a vector norm corresponding to the selected receiver antenna.

The foregoing form as well as other forms, features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 6 illustrates a block diagram of a second embodiment of a receiver of the FIG. 1 adaptive vector modulation transceiver.

DETAILED DESCRIPTION OF THE PRESENTLY PREFERRED EMBODIMENTS

Figure 1:
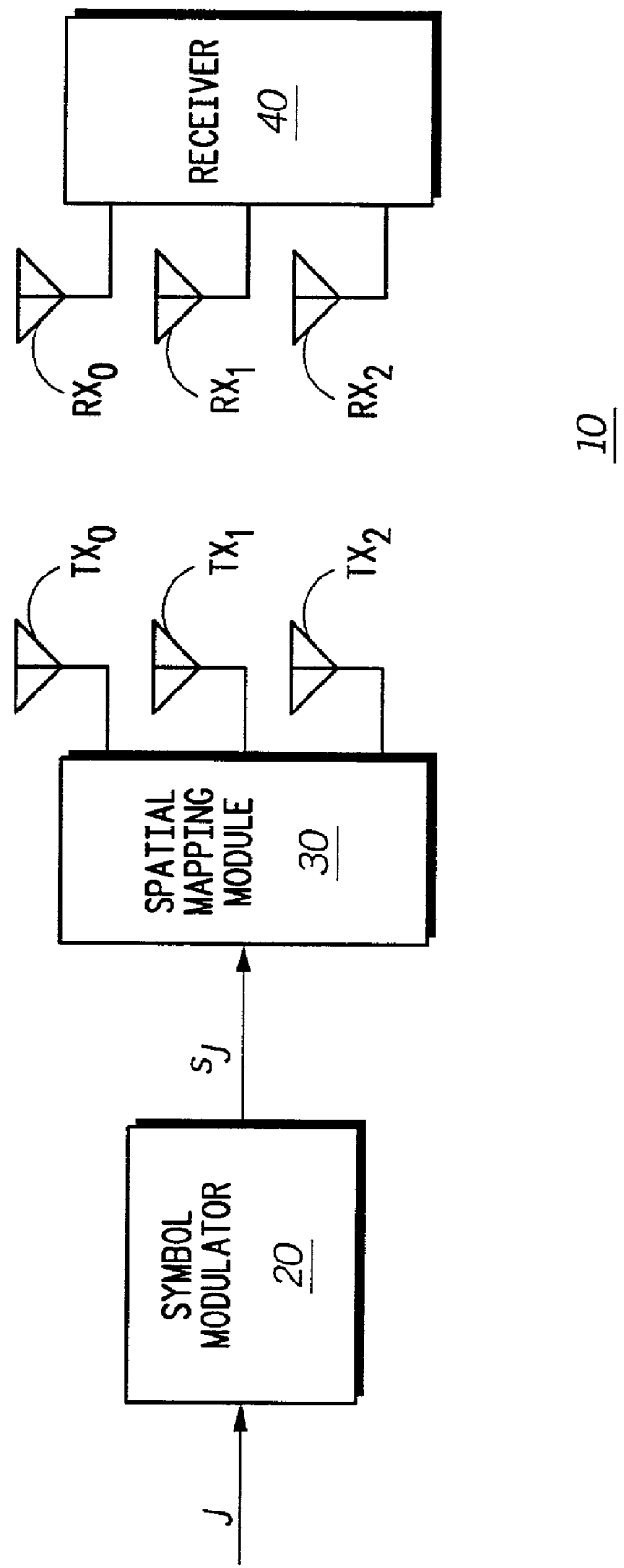
FIG. 1 illustrates a block diagram of one embodiment of an adaptive vector modulation transceiver in accordance with the present invention.

FIG. 1 illustrates one embodiment of an adaptive vector modulation (AVM) system transceiver 10 (hereinafter "AVM transceiver 10") in accordance with the present invention. A transmitter of the AVM transceiver 10 includes a symbol modulator 20 and a spatial mapping module 30. The symbol modulator 20 receives as an input a binary information stream assembled into groups of K bits forming symbol indices J. In response thereto, the symbol modulator 20 conventionally provides a generally complex-valued Quadrature Amplitude Modulation (QAM) symbol $s_J$ in the form of a member of any well-known constellation (e.g., 16-QAM, 64-QAM, etc.). The spatial mapping module 30 receives the modulation symbol $s_J$, and in response thereto, the spatial mapping module 30 generally directs a transmission of $M_T$ complex symbol values (not shown) from each of $M_T$ transmitter antennas where $1 \leq M_T$. In the embodiment of FIG. 1, $M_T=3$ whereby spatial mapping module 30 specifically directs a transmission of three (3) complex symbol values (not shown) from a transmitter antenna $TX_0$, a transmitter antenna $TX_1$ and a transmitter antenna $TX_2$, respectively.

The transmitted complex symbol values are received by one of $M_R$ receiver antennas where $1 \leq M_R$, and $M_T$ and $M_R$ may or may not have identical values. In the embodiment of FIG. 1, $M_R=3$ whereby the transmitted complex symbol values are received by one of a receiver antenna $RX_0$, a receiver antenna $RX_1$, and a receiver antenna $RX_2$. The complex symbol values transmitted from each transmitter antenna $TX_0$–$TX_2$ are weighted versions of modulation symbol $s_J$ where the weights are a function of the receiver antenna among the receiver antennas $RX_0$–$RX_2$ selected to receive the complex symbol values, and the propagation channels between the $M_T$ transmitter antennas and the $M_R$ candidate receiver antennas. The result is a normalization of the complex symbol values over the channel coefficients associated with the propagation channels.

Upon reception of the complex symbol values by the selected receiver antenna, the receiver 40 demodulates the complex symbol values to recover an estimate of the modulation symbol $s_J$ to thereby generate an estimate of the transmit symbol index J to obtain the binary information sequence input to the symbol modulator 20.

The symbol modulator 20, the spatial mapping module 30, and the receiver 40 may be implemented in hardware (analog or digital), software, or any combination of hardware and software. From a subsequent description of various embodiments of the spatial mapping module 30 and the receiver 40, those having ordinary skill in the art will appreciate a sequential operation of the components of the symbol modulator 20, the spatial mapping module 30, and the receiver 40 (e.g., in a software implementation) and a concurrent operation of the symbol modulator 20, the spatial mapping module 30, and the receiver 40 (e.g., in a hardware implementation).

Figure 2:
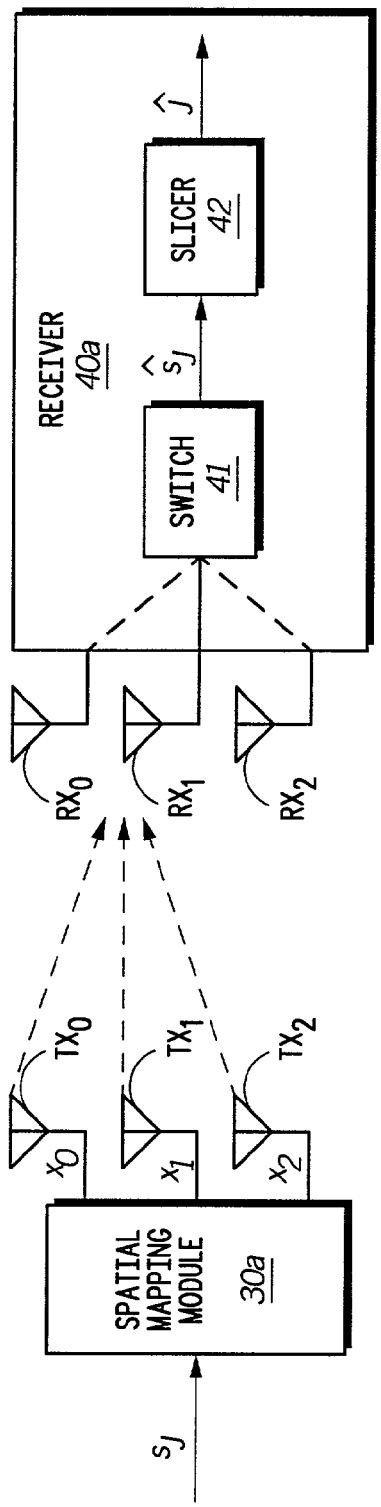
FIG. 2 illustrates a block diagram of a first embodiment of a spatial mapping module and a first embodiment of a receiver of the FIG. 1 adaptive vector modulation transceiver.

FIG. 2 illustrates a spatial mapping module 30a (for the particular case of $M_T=3$) as one embodiment of the spatial mapping module 30 (FIG. 1) and a receiver 40a as one embodiment of the receiver 40 (FIG. 1). In response to the modulation symbol $s_J$, and selection of the i-th receiver antenna, the spatial mapping module 30a generates a complex symbol value $x_0$, a complex symbol value $x_1$, and a complex symbol value $x_2$ in accordance with the following general equation [1]:

$$x_m = \frac{\sqrt{E_s}\,(h^*_{i,m})}{\sum_{J=0}^{M_T-1} |h_{i,J}|^2} s_J \quad m = 0, 1, \ldots, M_T - 1 \qquad [1]$$

where $E_s$ is a desired mean received symbol energy, $M_T$ is the number of transmitter antennas ($M_T=3$ for the spatial mapping module 30a), and $h_{i,j}$ is a complex-valued channel coefficient.

For this particular implementation, the complex-valued baseband-equivalent channels connecting the transmitter antennas $TX_0$–$TX_2$ with each of the receiver antennas $RX_0$–$RX_2$ is assumed to comprise a single coefficient (conventionally referred to as a 'flat' channel). Accordingly, there are $M_R \times M_T$ distinct channel coefficients. In one embodiment, the channel coefficients are organized into a matrix $L_1$ having $M_R$ rows (or groups) of $M_T$ coefficients (equivalently, $M_R$ length–$M_T$ row vectors) in accordance with the following equation [2]:

$$L_1 = \begin{bmatrix} h_{1,1} & h_{1,2} & \cdots & h_{1,M_T} \\ h_{2,1} & h_{2,2} & \cdots & \vdots \\ \vdots & \vdots & \ddots & \vdots \\ h_{M_R,1} & \cdots & \cdots & h_{M_R,M_T} \end{bmatrix} = \begin{bmatrix} h_1 \\ h_2 \\ \vdots \\ h_{M_R} \end{bmatrix} \qquad [2]$$

where each group comprises the $M_T$ channel coefficients connecting the transmitter antennas $TX_0$–$TX_2$ to one of the receiver antennas $RX_0$–$RX_2$.

A transmission of the complex symbol value $x_0$, the complex symbol value $x_1$, and the complex symbol value $x_2$ from the transmission antennas $TX_0$–$TX_2$, respectively, is directed along a subset of the channel coefficients of equation [2] in accordance with the antenna selection method of the present invention.

Figure 3:
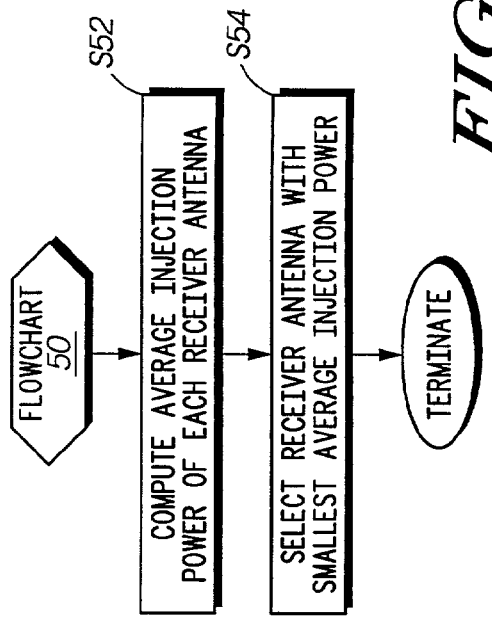
FIG. 3 illustrates a flowchart representative of a first embodiment of a receiver antenna selection method in accordance with the present invention.

FIG. 3 illustrates a flowchart 50 representative of one embodiment of a receiver antenna selection method. During a stage S52 of the flowchart 50, a metric proportional to the average injection power (AIP) (where the averaging process is defined with respect to the transmitted symbol process—whose component symbols may not have constant energy—and assumes the fading channel coefficients are approximately constant for a particular interval) corresponding to selection of the i-th (of $M_R$) candidate receiver antennas is computed in accordance with the following equation [3]:

$$AIP_i = \frac{1}{\sum_{J=0}^{M_T-1} |h_{i,j}|^2} \qquad [3]$$

During a stage S54 of the flowchart 50, the receiver antenna (selected over index i) having the smallest average injection power metric $AIP_i$ is selected, and that receiver antenna is then used to receive the complex symbol value $x_0$, the complex symbol value $x_1$, and the complex symbol value $x_2$ after implicit processing by the corresponding selected channel coefficient vector $h_i$ according to the definitions of equation [2].

Figure 4:
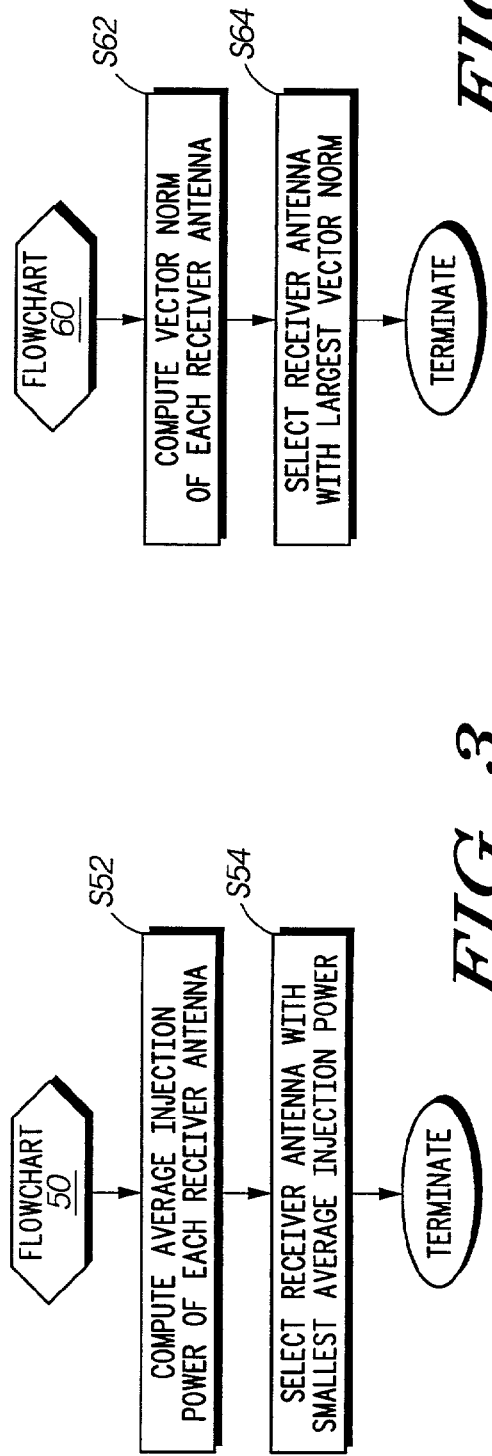
FIG. 4 illustrates a flowchart representative of a second embodiment of a receiver antenna selection method in accordance with the present invention.

FIG. 4 illustrates a flowchart 60 representative of another embodiment of a receiver antenna selection method. During a stage S62 of the flowchart 60, the $L_2$ vector norm (VN) of the row vector $h_i$ corresponding to each of the $M_R$ candidate receiver antennas is computed in accordance with the following equation [4]:

$$VN_i = \sum_{J=0}^{M_T-1} |h_{i,j}|^2 = \|h_i\|_2^2 \qquad [4]$$

During a stage S64 of the flowchart 60, the channel having the highest vector norm $VN_i$ is selected, and the corresponding i-th receiver antenna is used to receive the complex symbol value $x_0$, the complex symbol value $x_1$, and the complex symbol value $x_2$ after implicit processing by the corresponding selected channel coefficients $h_i$.

In one embodiment, the spatial mapping module 30a executes either the flowchart 50 or the flowchart 60, and communicates the receiver antenna selection to a switch 41 of the receiver 40a. In a second embodiment, the switch 41 executes either the flowchart 50 or the flowchart 60, and communicates the receiver antenna selection to the spatial mapping module 30a. In a third embodiment, both the spatial mapping module 30a and the switch 41 execute either the flowchart 50 and/or the flowchart 60, and handshake as to the receiver antenna selection.

In response to the receiver antenna selection, the switch 41 establishes a communication between the receiving antenna associated with the selected channel and a slicer 42 (which could equivalently be termed a hard-decision symbol estimator). For example, upon a selection of the channel 1, the switch 41 establishes a communication between the receiving antenna $RX_1$, and the slicer 42 as exemplary illustrated in FIG. 2. The slicer 42 receives a modulation signal $\hat{s}_J$ that is an estimation of modulation signal $s_J$. In response thereto, the slicer 42 conventionally generates a group of bits $\hat{J}$ as an estimate of the symbol index J (FIG. 1).

The description above was particularly intended for use in channels where each channel coefficient comprises a single complex-valued coefficient. The invention can be extended to include so-called frequency-selective channels (i.e., where the channel comprises a non-zero length time-series of complex-valued coefficients).

Figure 5:
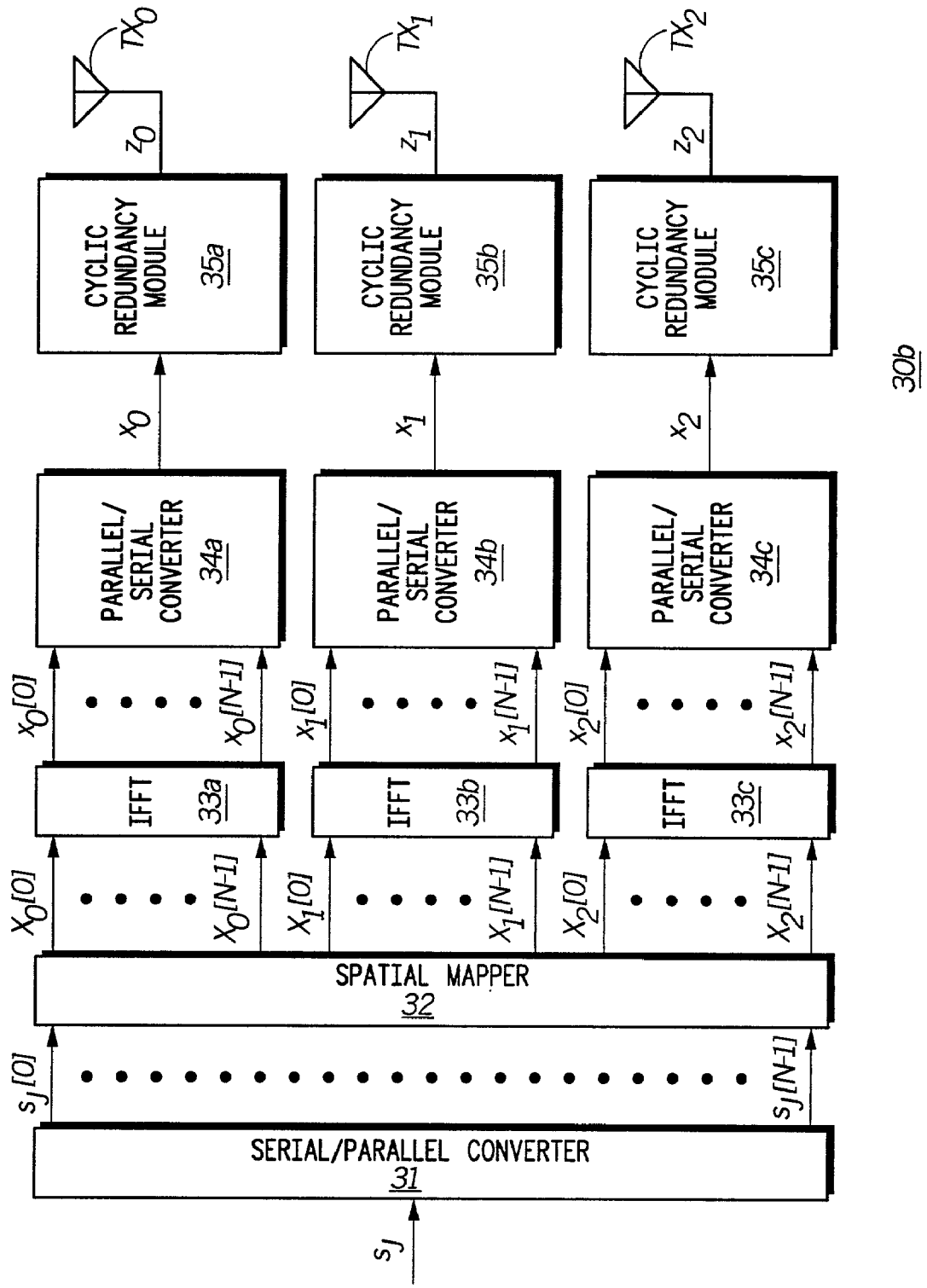
FIG. 5 illustrates a block diagram of a second embodiment of a spatial mapping module of the FIG. 1 adaptive vector modulation transceiver.

FIG. 5 illustrates a spatial mapping module 30b as another embodiment of spatial mapping module 30 (FIG. 1). The spatial mapping module 30b is an extension of the present invention to frequency-selective channels using the well-known technique of Orthogonal Frequency Division Modulation (OFDM). In response to a length-N sequence of modulation symbols $s_J$, a serial to parallel converter 31 conventionally concatenates the N modulation symbols $s_J$ into a group of modulation symbols $s_J[0], \ldots, s_J[N-1]$. A spatial mapper 32 provides a group of complex symbol values $X_0[0], \ldots, X_0[N-1]$, a group of complex symbol values $X_1[0], \ldots, X_1[N-1]$ and a group of complex symbol values $X_2[0], \ldots, X_2[N-1]$ as a function of modulation symbols $s_J[0], \ldots, s_J[N-1]$.

In one embodiment, given the selection of the i-th receiver antenna, the spatial mapper 32 generates complex symbol values $X_0[0], \ldots, X_0[N-1]$, complex symbol values $X_1[0], \ldots, X_1[N-1]$ and complex symbol values $X_2[0], \ldots, X_2[N-1]$ in accordance with the following equation [5]:

$$X_j[k] = \frac{\sqrt{E_s}\,(H_{i,j}^*[k])}{\sum_{m=0}^{M_T-1}|H_{i,m}[k]|^2} s_j[k] \quad k=0,1,\ldots,N-1;\, j=0,1,\ldots,M_T-1 \quad [5]$$

where $H_{i,j}[k]$ is generally the single frequency-domain complex-valued channel coefficient corresponding to the k-th (of N) OFDM sub-channel connecting the j-th transmitter antenna to the i-th receiver antenna.

An inverse Fast Fourier Transform 33*a* ("IFFT 33*a*") conventionally transforms the group of frequency-domain complex symbol values $X_0[0], \ldots, X_0[N-1]$ into a group of time-domain complex symbol values $x_0[0], \ldots, x_0[N-1]$. A parallel/serial converter 34*a* conventionally converts the group of time-domain complex symbol values $x_0[0], \ldots, x_0[N-1]$ into a time-domain complex symbol sequence denoted $x_0$. A cyclic redundancy module 35*a* conventionally adds a cyclic prefix and/or cyclic postfix to the time-domain complex symbol sequence $x_0$ to yield a time-domain complex symbol sequence $z_0$.

An IFFT 33*b* conventionally transforms the group of frequency-domain complex symbol values $X_1[0], \ldots, X_1[N-1]$ into a group of time-domain complex symbol values $x_1[0], \ldots, x_1[N-1]$. A parallel/serial converter 34*b* conventionally converts the group of time-domain complex symbol values $x_1[0], \ldots, {}_1[N-1]$ into a time-domain complex symbol sequence $x_1$. A cyclic redundancy module 35*b* conventionally adds a cyclic prefix and/or cyclic postfix to the time-domain complex symbol sequence $x_1$ to yield a time-domain complex symbol sequence $z_1$.

An IFFT 33*c* conventionally transforms the group of frequency-domain complex symbol values $X_2[0], \ldots, X_2[N-1]$ into a group of time-domain complex symbol values $x_2[0], \ldots, x_2[N-1]$. A parallel/serial converter 34*c* conventionally converts the group of time-domain complex symbol values $x_2[0], \ldots, x_2[N-1]$ into a time-domain complex symbol sequence $x_2$. A cyclic redundancy module 35*c* conventionally adds a cyclic prefix and/or cyclic postfix to the time-domain complex symbol sequence $x_2$ to yield a time-domain complex symbol sequence $z_2$.

The cyclic prefixes and/or cycle postfixes added to time-domain complex symbol sequences $x_0$–$x_2$ are determined by factors such as, for example, a maximum channel time-dispersion.

FIG. 6 illustrates an OFDM receiver 40*b* as another embodiment of the receiver 40 (FIG. 1). The switch 41 can operated as previously described herein in connection with the flowchart 50 (FIG. 3) with the metric proportional to the average injection power (AIP) (where averaging is again defined with respect to the transmitted symbol process, for a set of channel coefficients assumed constant over an interval) corresponding to each candidate (i-th) receiver antenna computed in accordance with the following equation [7]:

$$AIP_i = \sum_{k=0}^{N-1}\left(\frac{1}{\sum_{j=0}^{M_T-1}|H_{i,j}[k]|^2}\right) \quad [7]$$

Alternatively, the switch 41 can operated as previously described herein in connection with the flowchart 60 (FIG. 4) with the vector norm VN of the channel corresponding to the i-th receiver antenna is computed in accordance with the following equation [8]:

$$VN_i = \sum_{k=0}^{N-1}\left(\sum_{j=0}^{M_T-1}|H_{i,j}[k]|^2\right) = \sum_{k=0}^{N-1}\|H_i[k]\|_2^2 \quad [8]$$

where—in a manner similar to equation [2]—the row vector $H_i[k]$ is defined as the length-$M_T$ vector comprising $$H_i[k]=[H_{i,0}[k]H_{i,1}[k]\ldots H_{i,M_T}[k]].$$

A cyclic redundancy module 42 receives a time-domain complex symbol sequence $z_r$, and in response thereto, conventionally removes the cyclic prefix and/or the cyclic postfix to yield a time-domain complex symbol sequence $x_r$. A serial/parallel converter 43 conventionally converts the time-domain complex symbol sequence $x_r$ into a group of time-domain complex symbol values $x_r[0], \ldots, x_r[N-1]$. A Fast Fourier Transform 44 ("FFT 44") conventionally transforms the time-domain complex symbol values $x_r[0], \ldots, x_r[N-1]$ into a group of frequency-domain complex symbol values $\hat{s}_J[0]$–$\hat{s}_J[N-1]$. A parallel/serial converter 45 conventionally converts the frequency-domain complex symbol values $\hat{s}_J[0]$–$\hat{s}_J[N-1]$ into a set of N estimated modulation symbols $\hat{s}_J$ that is an estimate of modulation symbols $s_J$ (FIG. 1). The slicer 46 conventionally generates N symbol index estimates $\hat{J}$ each identifying K bits (FIG. 1).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method of operating a transmitting device including a plurality of transmitter antennas, that can communicate using a plurality of propagation channels between the plurality of transmitter antennas and a plurality of receiver antennas of a receiving device, said method comprising:
  receiving a binary stream assembled into groups of bits forming symbol indices;
  generating at least one complex symbol value in response to a reception of the binary stream, each complex symbol value of the at least one complex symbol value being normalized by a function based on at least one channel coefficient associated with each of the plurality of propagation channels; and transmitting the at least one complex symbol value from the plurality of transmitter antennas.

2. The method according to claim 1, wherein the at least one complex symbol value is generated according to:

$$x_m = \frac{\sqrt{E_s}\,(h^*_{i,m})}{\sum_{J=0}^{M_T-1} |h_{i,j}|^2} s_J \quad m = 0, 1, \ldots, M_T - 1$$

where $X_m$ is the at least one complex symbol value,
where i is an index of a selected receiver antenna to receive the at least one complex symbol value,
where m is an index of a selected transmitter antenna to transmit the at least one complex symbol value,
where $\sqrt{E_s}$ is a value proportional to a voltage that is normalized by the formula,
where $h_{x,y}$ is a measured complex channel coefficient of the propagation channel between receiver antenna x and transmitter antenna y,
where h* is a complex conjugate of h, and
where $M_T$ is a quantity of the plurality of transmitter antennas.

3. The method according to claim 1, wherein the at least one complex symbol value is generated according to:

$$X_j[k] = \frac{\sqrt{E_s}\,(H^*_{i,j}[k])}{\sum_{m=0}^{M_T-1} |H_{i,m}[k]|^2} s_j[k] \quad k = 0, 1, \ldots, N-1;\ j = 0, 1, \ldots, M_T - 1$$

where $X_j[k]$ is the at least one complex symbol value,
where i is an index of a selected receiver antenna to receive the at least one complex symbol value,
where m is an index of a selected transmitter antenna to transmit the at least one complex symbol value,
where k is an index of OFDM sub-channels connecting a j-th transmitter antenna to an i-th receiver antenna,
where $\sqrt{E_s}$ is a value proportional to a voltage that is normalized by the formula,
where $H_{x,y}[k]$ is a measured complex channel coefficient of the propagation channel between receiver antenna x and transmitter antenna y,
where H* is the complex conjugate of H,
where N is the quantity of OFDM channels, and
where $M_T$ is the quantity of the plurality of transmitter antennas.

4. The method of claim 1, further comprising:
selecting a first receiver antenna of the plurality of receiver antennas as a function of a metric proportional to an average injection power corresponding to the first receiver antenna.

5. The method of claim 1, further comprising:
selecting a first receiver antenna of the plurality of receiver antennas as a function of a vector norm corresponding to the first receiver antenna.

6. A transmitting device, comprising:
a plurality of transmitter antennas, wherein the transmitting device can communicate using one or more propagation channels between said plurality of transmitter antennas and a plurality of receiver antennas of a receiving device; and
a transmitter operable to generate at least one complex symbol value in response to a reception of a binary stream assembled into groups of bits forming symbol indices, each complex symbol value of the at least one complex symbol value being normalized by a function based on at least one channel coefficient associated with each of said plurality of propagation channels.

7. The transmitting device according to claim 6, wherein said transmitter generates the at least one complex symbol value according to:

$$x_m = \frac{\sqrt{E_s}\,(h^*_{i,m})}{\sum_{J=0}^{M_T-1} |h_{i,j}|^2} s_J \quad m = 0, 1, \ldots, M_T - 1$$

where $x_m$ is the at least one complex symbol value,
where i is an index of a selected receiver antenna to receive the at least one complex symbol value,
where m is an index of a selected transmitter antenna to transmit the at least one complex symbol value,
where $\sqrt{E_s}$ is a value proportional to a voltage that is normalized by the formula,
where $h_{x,y}$ is a measured complex channel coefficient of the propagation channel between receiver antenna x and transmitter antenna y,
where h* is a complex conjugate of h, and
where $M_T$ is a quantity of the plurality of transmitter antennas.

8. The transmitting device according to claim 6, wherein said transmitter generates the at least one complex symbol value according to:

$$X_j[k] = \frac{\sqrt{E_s}\,(H^*_{i,j}[k])}{\sum_{m=0}^{M_T-1} |H_{i,m}[k]|^2} s_j[k]$$

$$k = 0, 1, \cdots, N-1;\ j = 0, 1, \cdots, M_T - 1$$

where $X_j[k]$ is the at least one complex symbol value,
where i is an index of a selected receiver antenna to receive the at least one complex symbol value,
where m is an index of a selected transmitter antenna to transmit the at least one complex symbol value,
where k is an index of OFDM sub-channels connecting a j-th transmitter antenna to an i-th receiver antenna,
where $\sqrt{E_s}$ is a value proportional to a voltage that is normalized by the formula,
where $H_{x,y}[k]$ is a measured complex channel coefficient of the propagation channel between receiver antenna x and transmitter antenna y,
where H* is the complex conjugate of H,
where N is the quantity of OFDM channels, and
where $M_T$ is the quantity of the plurality of transmitter antennas.

9. The transmitting device of claim 6, wherein:
said transmitter is further operable to select a first receiver antenna of said plurality of receiver antennas as a function of a metric proportional to an average injection power of corresponding to said first receiver antenna; and
said plurality of transmitting antennas are operable to transmit the at least one complex symbol value to said first receiver antenna.

10. The transmitting device of claim 6, further comprising:

a receiver operable to select a first receiver antenna of said plurality of receiver antennas as a function of a metric proportional to an average injection power corresponding to said first receiver antenna, wherein said plurality of transmitting antennas are operable to transmit the at least one complex symbol value to said first receiver antenna.

11. The transmitting device of claim 6, wherein:

said transmitter is further operable to select a first receiver antenna of said plurality of receiver antennas as a function of a vector norm corresponding to said first receiver antenna; and said plurality of transmitter antennas are operable to transmit the at least one complex symbol value to said first receiver antenna.

12. The transmitting device of claim 6, further comprising:

a receiver operable to select a first receiver antenna of said plurality of receiver antennas as a function of a vector norm corresponding to said first receiver antenna, wherein said plurality of transmitting antennas are operable to transmit the at least one complex symbol value to said first receiver antenna.

13. A method of operating a transmitting device including a plurality of transmitter antennas, wherein the transmitting device can communicate using one or more propagation channels between the plurality of transmitter antennas and a plurality of receiver antennas of a receiving device, said method comprising:

computing a metric for one of the plurality of transmitter antennas, wherein the metric is proportional to an average injection power that would be used for each receiver antenna of the plurality of receiver antennas of the receiving device, wherein the metric is based on measured, complex channel coefficients associated with those of the one or more propagation channels that are between the transmitter antenna and the receiving antennas;

selecting a first antenna of the plurality of receiver antennas of the receiving device having a smallest average injection power to receive at least one complex value symbol from the transmitter antennas.

14. The method according to claim 13, wherein all computations of the metric proportional to the average injection power are according to:

$$AIP_i = \frac{1}{\sum_{j=0}^{M_T-1} |h_{i,j}|^2}$$

where $AIP_i$ is the average injection power, where i is an index of a selected receiver antenna, where j is an index of a selected transmitter antenna to transmit the at least one complex symbol value, where $h_{x,y}$ is a measured complex channel coefficient of the propagation channel between receiver antenna x and transmitter antenna y, and where $M_T$ is a quantity of the plurality of transmitter antennas.

15. The method according to claim 13, wherein all computations of the metric proportional to the average injection power are according to:

$$AIP_i = \sum_{k=0}^{N-1} \left( \frac{1}{\sum_{j=0}^{M_T-1} |H_{i,j}[k]|^2} \right)$$

where $AIP_i$ is the average injection power, where i is an index of a selected receiver antenna to receive the at least one complex symbol value, where j is an index of a selected transmitter antenna to transmit the at least one complex symbol value, where k is an index of OFDM sub-channels connecting a j-th transmitter antenna to an i-th receiver antenna, where $H_{x,y}[k]$ is a measured complex channel coefficient of the propagation channel between receiver antenna x and transmitter antenna y, where N is the quantity of the OFDM sub-channels, and where $M_T$ is the quantity of the plurality of transmitter antennas.

16. A method of operating a transmitting device including a plurality of transmitter antennas, wherein the transmitting device can communicate using one or more propagation channels between the plurality of transmitter antennas and a plurality of receiver antennas of a receiving device, said method comprising:

computing a vector norm for each particular receiver antenna of the plurality of receiver antennas of the receiving device based on a vector comprising measured, complex channel coefficients associated with the one or more propagation channels that include the particular antenna;

selecting a first antenna of the plurality of receiver antennas of the receiving device having a largest vector norm to receive at least one complex value symbol from the plurality of transmitter antennas.

17. The method of claim 16, wherein all computations of the vector norm are according to:

$$VN_i = \sum_{j=0}^{M_T-1} |h_{i,j}|^2 = \|h_i\|_2^2$$

where $VN_i$ is the vector normal of one of the plurality of receiver antennas, where i is an index of a selected receiver antenna to receive the at least one complex symbol value, where j is an index of a selected transmitter antenna to transmit the at least one complex symbol value, where $h_{x,y}$ is a measured complex channel coefficient of the propagation channel between receiver antenna x and transmitter antenna y, and where $M_T$ is the quantity of the plurality of transmitter antennas.

18. The method according to claim 16, wherein all computations of the vector norm are according to:

$$VN_i = \sum_{k=0}^{N-1} \left( \sum_{j=0}^{M_T-1} |H_{i,j}[k]|^2 \right) = \sum_{k=0}^{N-1} \|H_i[k]\|_2^2$$

where $VN_i$ is the vector norm of one of the plurality of receiving antennas, where i is an index of a selected receiver antenna to receive the at least one complex symbol value, where j is an index of a selected transmitter antenna to transmit the at least one complex symbol value, where k is an index of OFDM sub-channels connecting a j-th transmitter antenna to an i-th receiver antenna, where $H_{x,y}[k]$ is a measured complex channel coefficient of the propagation channel between receiver antenna x and transmitter antenna y, where N is the quantity of the OFDM sub-channels, and where $M_T$ is the quantity of the plurality of transmitter antennas.

19. A transmitting device, comprising:

a plurality of transmitter antennas, wherein the transmitting device can communicate using one or more propagation channels between said plurality of transmitter antennas and a plurality of one or more receiver antennas of a receiving device; and a module operable to compute a metric for one of the plurality of transmitter antennas, wherein the metric is proportional to an average injection power that would be used for each receiver antenna of said plurality of receiver antennas of the receiving device, wherein the metric is based on measured, complex channel coefficients associated with those of the one or more propagation channels that are between the transmitter antenna and the receiving antennas, and wherein said module is further operable to select a first antenna of said plurality of receiver antennas of the receiving device having a smallest average injection power to receive at least one complex value symbol from said plurality of transmitter antennas.

20. The transmitting device according to claim 19, wherein said module performs all computations of the metric proportional to the average injection power according to:

$$AIP_i = \frac{1}{\sum_{j=0}^{M_T-1} |h_{i,j}|^2}$$

where $AIP_i$ is the average injection power, where i is an index of a selected receiver antenna, where j is an index of a selected transmitter antenna to transmit the at least one complex symbol value, where $h_{x,y}$ is a measured complex channel coefficient of the propagation channel between receiver antenna x and transmitter antenna y, and where $M_T$ is a quantity of the plurality of transmitter antennas.

21. The transmitting device according to claim 19, wherein said module performs all computations of the metric proportional to the average injection power according to:

$$AIP_i = \sum_{k=0}^{N-1} \left( \frac{1}{\sum_{j=0}^{M_T-1} |H_{i,j}[k]|^2} \right)$$

where $AIP_j$ is the average injection power, where i is an index of a selected receiver antenna to receive the at least one complex symbol value, where j is an index of a selected transmitter antenna to transmit the at least one complex symbol value, where k is an index of OFDM sub-channels connecting a j-th transmitter antenna to an i-th receiver antenna, where $H_{x,y}[k]$ is a measured complex channel coefficient of the propagation channel between receiver antenna x and transmitter antenna y, where N is the quantity of the OFDM sub-channels, and where $M_T$ is the quantity of the plurality of transmitter antennas.

22. A transmitting device, comprising:

a plurality of transmitter antennas, wherein the transmitting device can communicate using one or more propagation channels between said plurality of transmitter antennas and a plurality of receiver antennas of a receiving device; and a module operable to compute a vector norm for each particular receiver antenna of said plurality of receiver antennas of the receiving device based on a vector comprising measured, complex channel coefficients associated with the one or more propagation channels that include the particular antenna, said module further operable to select a first antenna of said plurality of receiver antennas having a largest vector norm to receive at least one complex value symbol from said plurality of transmitter antennas.

23. The transmitting device of claim 22, wherein said module performs all computations of the vector norm according to:

$$VN_i = \sum_{j=0}^{M_T-1} |h_{i,j}|^2 = \|h_i\|_2^2$$

where $VN_i$ is the vector normal of one of the plurality of receiver antennas, where i is an index of a selected receiver antenna to receive the at least one complex symbol value, where j is an index of a selected transmitter antenna to transmit the at least one complex symbol value, where $h_{x,y}$ is a measured complex channel coefficient of the propagation channel between receiver antenna x and transmitter antenna y, and where $M_T$ is the quantity of the plurality of transmitter antennas.

24. The transmitting device according to claim 22, wherein said module performs all computations of the vector norm according to:

$$VN_i = \sum_{k=0}^{N-1} \left( \sum_{j=0}^{M_T-1} |H_{i,j}[k]|^2 \right) = \sum_{k=0}^{N-1} \|H_i[k]\|_2^2$$

where $VN_i$ is the vector norm of one of the plurality of receiving antennas, where i is an index of a selected receiver antenna to receive the at least one complex symbol value, where j is an index of a selected transmitter antenna to transmit the at least one complex symbol value, where k is an index of OFDM sub-channels connecting a j-th transmitter antenna to an i-th receiver antenna, where $H_{x,y}[k]$ is a measured complex channel coefficient of the propagation channel between receiver antenna x and transmitter antenna y, where N is the quantity of the OFDM sub-channels, and where $M_T$ is the quantity of the plurality of transmitter antennas.

* * * * *